United States Patent
Oka et al.

(10) Patent No.: US 7,482,573 B2
(45) Date of Patent: Jan. 27, 2009

(54) OPTICAL HEAD, OPTICAL REPRODUCTION APPARATUS AND OPTICAL RECORD AND REPRODUCTION APPARATUS

(75) Inventors: Teiichiro Oka, Tokyo (JP); Yoshinori Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 345 days.

(21) Appl. No.: 11/059,604

(22) Filed: Feb. 17, 2005

(65) Prior Publication Data

US 2005/0178945 A1     Aug. 18, 2005

(30) Foreign Application Priority Data

Feb. 18, 2004    (JP)    ............... 2004-041701

(51) Int. Cl.
| | |
|---|---|
| G02F 1/01 | (2006.01) |
| G02B 7/04 | (2006.01) |
| G02B 26/08 | (2006.01) |
| G11B 7/00 | (2006.01) |
| G03H 1/12 | (2006.01) |

(52) U.S. Cl. ................. 250/225; 250/201.5; 369/44.23; 369/112.01; 359/11; 359/223

(58) Field of Classification Search .............. 250/201.5, 250/225, 216; 369/13.29, 110.08, 118, 112.17, 369/44.11, 44.12, 44.14, 44.23, 44.24, 110.01, 369/112.7, 112.01; 359/661, 662, 664, 819, 359/11, 30, 223, 246, 281, 283, 301, 304, 359/379, 501; 356/33, 28, 308, 451, 453, 356/487, 491, 370

See application file for complete search history.

(56) References Cited

U.S. PATENT DOCUMENTS

| | | | | |
|---|---|---|---|---|
| 4,766,582 A | * | 8/1988 | Ando | .................... 369/44.24 |
| 4,843,232 A | * | 6/1989 | Erno et al. | .................... 250/225 |
| 5,317,144 A | * | 5/1994 | Oono et al. | .............. 250/201.5 |
| 5,317,555 A | * | 5/1994 | Takahashi et al. | ...... 369/110.04 |
| 5,350,917 A | * | 9/1994 | Taniguchi et al. | ........... 250/216 |

(Continued)

FOREIGN PATENT DOCUMENTS

JP          2555239        8/1996

(Continued)

*Primary Examiner*—Georgia Y Epps
*Assistant Examiner*—Don Williams
(74) *Attorney, Agent, or Firm*—Oblon, Spivak, McClelland, Maier & Neustadt, P.C.

(57) ABSTRACT

Beams of light emitted from a light source are incident on a polarizer. The direction of a transmission axis of the polarizer can be adjusted in advance such that the polarizer transmits P polarized light, and S polarized light is attenuated. Beams of light transmitted through a diffracting device and a collimator lens for incidence on a beam splitter are made up substantially only by P polarized light. Part of the beams of light, which is reflected on the beam splitter, is incident on a photodetector for feedback control of outputs from the light source. Since S polarized light is attenuated by the polarizer, only P polarized light is incident on the photodetector. Consequently, if the quantity of emitted laser beams changes, a ratio between the quantity of light for record and reproduction and the quantity of light for APC remains substantially constant, thereby increasing accuracy of detecting the intensity of laser beams, to avoid errors in record and reproduction.

14 Claims, 6 Drawing Sheets

U.S. PATENT DOCUMENTS

| | | | |
|---|---|---|---|
| 5,703,861 A * | 12/1997 | Matsuda | 369/110.03 |
| 5,883,872 A * | 3/1999 | Kino | 369/112.24 |
| 6,611,487 B2 * | 8/2003 | Shimano et al. | 369/112.01 |
| 6,940,794 B2 * | 9/2005 | Hayashi | 369/47.5 |

FOREIGN PATENT DOCUMENTS

| | | |
|---|---|---|
| JP | 8-255368 | 10/1996 |
| JP | 10-255314 | 9/1998 |
| JP | 2001-118281 | 4/2001 |

* cited by examiner

OPTICAL HEAD, OPTICAL REPRODUCTION APPARATUS AND OPTICAL RECORD AND REPRODUCTION APPARATUS

BACKGROUND OF THE INVENTION

The present invention relates to an optical head for controlling an output from a light source using a front monitor system, and an optical reproduction apparatus and an optical record and reproduction apparatus which uses the optical head installed therein.

Outputs from a light source of an optical head used in an optical record and reproduction apparatus need to be controlled accurately and stably with respect to change in environment such as temperature and elapse of time in recording and reproducing of various types of optical information recording media. Since outputs from a semiconductor laser generally used as a light source in optical heads fluctuate due to a change in temperature or aging, in order to have a stable output from the light source constantly, it is a general practice to attempt to stabilize the power level of a beam of light emitted to an optical information recording medium such as an optical disk by implementing power control through APC (Auto Power Control).

As systems representative of the APC, there are known a rear monitor system and a front monitor system. The rear monitor system is a system in which beams of light emitted from a rear side of a semiconductor laser chip towards the interior of a laser package are detected by a photodetector provided in the interior of the package. In this system, since the photodetector is provided inside the laser package, the optical head can be made smaller in size. Currently, this rear monitor system is used in reproduction only apparatuses or those in exclusive use for reproduction.

In the rear monitor system, however, since beams of light emitted from an end face of the semiconductor laser which is opposite to a radiating surface thereof, there has been a problem that the detection accuracy deteriorates. Consequently, the front monitor system is used in recording types which require high accuracy. The front monitor system is a system in which part of beams of light emitted from the semiconductor laser, which is the light source, is split, so that split light is detected to be fed back to a driving circuit of the semiconductor laser, whereby the output of the semiconductor laser is controlled by virtue of the intensity of the split light. Specifically, part of light emitted from the semiconductor laser is received by a front monitoring photodetector for feedback control, and the power control is implemented through APC. Note that since the front monitor system is more accurate than the rear monitor system, the front monitor system may also be used for reproduction only apparatuses.

Incidentally, in order to implement APC with good accuracy, it is desirable that a quantity of light that is incident on the front monitoring photodetector and a quantity of light that is actually used in record and reproduction of information are at a constant ratio at all times. Normally, laser beam that is used in recording and reproducing is linear polarized light traveling in a direction of a TE wave which is parallel with an interface of an active layer of the semiconductor laser (hereinafter, referred to as TE polarized light).

On the other hand, a spontaneous emission component in which phase and polarization are not in regulated is also emitted from the semiconductor laser. Since the spontaneous emission component is emitted widely from the semiconductor laser, when compared with an emitted light made up of a laser beam with less divergence, the far field pattern (hereinafter, referred to as FFP) expands widely. The spontaneous emission component is light which is not used in record and reproduction of information, and in the event that the spontaneous light reaches to an optical information recording medium to be reflected thereon or is reflected irregularly in the interior of a casing of the optical head or other optical components, the light so reflected constitutes a kind of so-called stray light. In the event that stray light reaches a detector for reproduction signals or servo signals for the optical information recording medium, it constitutes a cause for deterioration in quality of various types of signals, representative of increase in noise and deterioration in jitter.

Here, the output properties of semiconductor lasers that are used in record and reproduction of information will be described while referring to FIG. 7. FIG. 7A shows an example of the output properties of a semiconductor laser of GaAs system (a red semiconductor laser), and FIG. 7B shows an example of the output properties of a semiconductor laser of nitride system (violet semiconductor laser), represented by GaN, which has been started to be used in recent years.

In FIGS. 7A, 7B, a dotted line C is an extension from the slope of a straight line before the radiation of a laser beam and represents the output of a spontaneous emission component contained in an emitted light. In addition, a dotted line A and a dotted line B are such as to represent values of driving currents which are needed in reproduction and record of information, respectively. A spontaneous emission component is emitted before the radiation of a laser beam, and in a polarization state as this occurs, the intensity of both TE polarization component and TM polarization (a polarization which vibrates in a direction perpendicular to TE polarization) component is substantially identical. On the other hand, after a laser beam is radiated by being driven by a sufficiently large current, most component is TE polarization.

Generally, since a large output of laser beam is necessary in recording information, the driving current becoming large, there will be no serious problem even in the event that TE polarization constitutes most of the radiation of a laser beam (the dotted line B). However, an output necessary in reproducing the information is smaller than the output needed in recording and is on the order of a magnitude which is slightly larger than the output of a current necessary to start the radiation of a laser beam (the dotted line A). In a region like this, a ratio of the spontaneous emission component relative to the total output is relatively large, and hence the spontaneous emission component needs to be taken into consideration. In addition, as shown in FIG. 7, since the spontaneous emission component is larger in the semiconductor laser of GaN system than in the semiconductor laser of GaAs system, in particular, the effect of the spontaneous emission component becomes large.

Here, referring to FIGS. 8 and 9, a conventional optical head adopting the front monitor system (for example, Japanese Patent No. 2555239) will be described. FIG. 8 is a side view illustrating the schematic configuration of the conventional optical head and FIG. 9 is a plan view illustrating the schematic configuration of the conventional optical head.

As shown in FIGS. 8 and 9, a beam of light emitted from a light source 1 made up of a semiconductor laser is split into three beams of light for generating a tracking error signal at a diffraction device 2, and the three beams of light so split are then made to be parallel beams of light by a collimator lens 3 so as to be incident on a beam splitter 4a as beams of P polarized light. Note that, relative to the beam splitter 4a shown in FIG. 9, polarized light which vibrates in a parallel direction to the surface of a sheet of paper on which FIG. 9 is drawn is assumed as P polarized light, and polarized light which vibrates in a perpendicular direction relative to the surface of the sheet of paper is assumed as S polarized light. In addition, the light source 1 is disposed such that the direction of TE polarized light emitted from the light source 1 and the direction of P polarized light coincide with each other. The beam splitter 4a has, for example, properties in which on the order of 90% of P polarized light is transmitted therethrough and the remaining 10% thereof is reflected thereon.

As shown in FIG. 8, beams of light which have been transmitted through the beam splitter 4a are reflected by a reflecting mirror 5 for rise, whereby the optical path thereof is directed. Then, the beams of light are then made into beams of circular polarized light when passing through a ¼ wave-length plate 6 and is then incident on an objective lens 7. The beams of light are then made to be convergent beams at the objective lens 7, so that the beams of light so converged are then converged on an information track on an information recording surface of an optical information recording medium 8. Note that the objective lens 7 is installed on an actuator 9 which is movable in at least focusing and tracking directions relative to the optical information recording medium 8.

Beams of light reflected on the information recording surface of the optical information recording medium 8 transmit through the objective lens 7 and are then converted into beams of S polarized light (beams of linear polarized light which intersect at right angles with an outbound path from the light source 1 to the ¼ wave-length plate 6) at the ¼ wave-length plate 6. Then, the beams of light so converted are reflected by the reflecting mirror 5 so as to be incident on the beam splitter 4a as the beams of S polarized light.

Since the beam splitter 4a reflects almost 100% of the S polarized light, beams of light that are reflected by the beam splitter 4a, as shown in FIG. 9, are made to be convergent beams of light at an imaging lens 10 and are given an astigmatic aberration for generating a focus error signal at an anamorphic lens 11. Then, the beams of light so given the astigmatic aberration are incident on a photodetector 12 so as to be converted into an electric signal at a light receiving portion thereof On the other hand, beams of light, which constitute part of the beams of light emitted from the light source 1 and are reflected by the beam splitter 4a, enter a front monitoring photodetector 13, as shown in FIG. 9. Then, the beams of light are converted into an electric signal for monitoring outputs from the light source at a light receiving portion of the photodetector 13, and the output monitoring electric signal so converted is then used for feedback control of outputs from the light source 1.

On the other hand, various methods have been proposed in which APC is implemented using part of beams of light which are out of the effective range and hence are not used in information record and reproduction (for example, Patent Document JP-A-2001-118281 and JP-A-10-255314). Here, the "beams of light which are out of the effective range" means beams of light which are other than beams of light which fall within the effective range and hence are effectively used in information record and reproduction.

Referring to FIG. 10, an optical head according to the related art will be described. FIG. 10 is a plan view illustrating the schematic configuration of a conventional optical head. A photodetector 13 is disposed on an optical path for peripheral beams of light.

As shown in FIG. 10, beams of light emitted from a light source 1 which have a highest intensity and which are located substantially centrally (beams of light which fall within the effective range and which are hence effectively used in information record and reproduction) are incident on a diffracting device 2, where the beams of light are split into three beams of light for generating a tracking error signal. Then, the beams of light so split are made to be parallel beams when they transmit through a collimator lens 3 and are then incident on a beam splitter 4b. In addition, the light source 1 is disposed such that the direction of TE polarized light emitted from the light source 1 and the direction of P polarized light in the beam splitter 4b coincide with each other.

The beam splitter 4b has properties to transmit nearly 100% of the P polarized light and to reflect nearly 100% of the S polarized light. Consequently, beams of P polarized light are allowed to transmit through the beam splitter 4b, whereas beams of S polarized light are reflected by the beam splitter 4b.

Similarly to the related art that have already been described above, beams of P polarized light, which have transmitted through the beam splitter 4b, are reflected by a reflecting mirror 5 and are made into beams of circular polarized light when they transmit through a ¼ wave-length plate 6. Thereafter, the beams of light enter an objective lens 7 and are then converged on an information track on an information recording surface of an optical information recording medium 8. The beams of light, which are reflected on the information recording surface of the optical information recording medium 8, are converted into beams of S polarized light (beams of linear polarized light which intersect at right angles with an outbound path from the light source 1 to the ¼ wave-length plate 6) at the ¼ wave-length plate 6, so that the beams of light so polarized are incident on the beam splitter 4b as S polarized light.

Since the beam splitter 4b has the properties to reflect nearly 100% of the S polarized light, the beams of S polarized light which have been reflected on the beam splitter 4b transmit along an imaging lens 10 and an anamorphic lens 11 so as to be incident on a photodetector 12. The photodetector 12 converts the beams of S polarized light into an electric signal in accordance with a quantity of light the photodetector 12 has received. A predetermined operation is applied to an electric signal resulting from the conversion so as to generate a focus error signal, a tracking error signal and a reproduction signal.

On the other hand, beams of light that are emitted from the light source 1 and which constitute part of beams of light which are out of the effective range are not incident on a diffracting device 2 but are incident on a photodetector 13 which is similarly disposed out of the effective range. Then, the beams of light are converted into an electric signal for monitoring outputs from the light source 1 by a light receiving portion of the photodetector 13, and an output monitoring electric signal resulting from the conversion is used for feed-back control of outputs of the light source 1.

In the case of the optical head shown in FIGS. 8 and 9, what is converged on to the optical information recording medium 8 for recording and reproducing of information is made up only of the laser beam, which is P polarized light (=TE polarized light), while, of the light emitted from the light source 1, 10% of the P polarized light and 100% of the S polarized light are incident on the photodetector 13. Since the ratio of P polarized light and S polarized light changes depending on the driving current of the light source 1, the intensity ratio between the beams of light that has transmitted through the beam splitter 4b for information record and reproduction and the beams of light for APC (beams of light which are received by the photodetector 13) in which the ratio of S polarized light, which is the spontaneous emission component, is increased due to the reflection on the beam splitter 4b does not become constant relative to optical outputs from the light source 1. Due to this, there is generated an error in APC.

Here, the error so generated will be described specifically. In a case where intensities with which beams of light, which are converged on to the information recording surface of the optical recording medium 8 to form beam spots directly used for recording and reproducing of information, are emitted onto the optical information recording medium 8 are 4.5 [mW] and 0.45[mW], respectively, assuming that the light utilization efficiency of the optical system for the optical head excluding the beam splitter 4b is 15%, since the transmittance of the beam splitter 4b for the P polarized light (=TE polarized light) is 90%, the output of the laser beam source necessary at the time of record becomes on the order of 33[mW], and that necessary at the time of reproduction becomes 3.3[mW]. This state substantially correspond to the dotted lines B, A shown in FIG. 7B, respectively. In addition, the spontaneous emission component emitted from the light source 1 corresponds to the dotted line C in FIG. 7B, and since TE polarized light and TM polarized light are contained therein in substantially the same quantity, the intensity of both TE polarized light and TM polarized light in the spontaneous emission component outputted at the time of record becomes on the order of 0.92[mW], and the intensity of both TE polarized light and TM polarized light in the spontaneous emission component outputted at the time of reproduction become on the order of 0.77[mW].

On the other hand, as to the front monitoring photodetector 13, in consideration of FFP, the vignetting factor of the light receiving portion of the photodetector 13 is made to be 4.0% for laser beam and 3.0% for spontaneous emission component. Since the reflectance of the beam splitter 4b is 10% for P polarized light (=TE polarized light) and 100% for S polarized light (=TM polarized light), a luminous intensity detected at the photodetector 13 at the time of record is;

(laser beam(TE polarized light)) +

(spontaneous emission component (TE polarized light)) +

(spontaneous emission component (TM polarized light)) =

$(33 \times 4.0\% \times 10\%) + (0.92 \times 3.0\% \times 10\%) + (0.92 \times 3.0\% \times 100\%) =$ 0.16 [mW]

In addition, similarly, a luminous intensity detected at the photodetector 13 at the time of reproduction is;

$= (3.3 \times 4.0\% \times 10\%) + (0.77 \times 3.0\% \times 10\%) +$ $(0.77 \times 3.0\% \times 100\%)$ $= 0.04$ [mW]

Due to this, the ratio of the quantity of light that reaches the optical information recording medium 8 to be actually used for record and reproduction of information to the quantity of light detected by the photodetector 13 becomes;

0.16/4.5=3.6% at the time of record, and 0.04/0.45=8.6% at the time of reproduction, whereby the ratios become different largely between the time of record and the time of reproduction.

Thus, in the case of the semiconductor laser of GaN in which the spontaneous emission constant is large, since the ratio between the quantity of light for record and reproduction and the quantity of light for APC changes depending on the magnitude of the quantity of emitted light (driving current), there is generated an error in APC. In addition, as with the optical system shown in FIGS. 8 and 9, in the optical system in which parallel beams are incident on the beam splitter 4a by means of the collimator lens 3, the angle of incidence of a ray of light relative to the splitting surface of the beam splitter 4b becomes equal over the whole area of the section of the beam of light. Consequently, since the reflectance of P polarized light and S polarized light becomes equal over the whole area of the section of the beam of light, even in the event that the area and shape of the light receiving portion of the front monitoring photodetector 13 are changed, or the photodetector 13 itself is caused to deviate to be disposed, it is difficult to reduce the error.

In addition, in the case of the optical head shown in FIG. 10, while the photodetector 13 receives part of the beams of light which are out of the effective range and are hence not used for recording and reproducing of information, since, in the beams of light which are out of the effective range, the intensity ratio of the spontaneous emission component in which FFP expands largely is increased, the error in APC is increased.

Here, the error so generated will be described specifically. In a case where intensities with which beams of light, which are converged on to the information recording surface of the optical recording medium 8 to form beam spots directly used for recording and reproducing of information, are emitted onto the optical information recording medium 8 are 4.5 [mW] and 0.45[mW], respectively, assuming that the light utilization efficiency of the optical system for the optical head excluding the beam splitter 4b is 15%, since the transmittance of the beam splitter 4b for the P polarized light (=TE polarized light) is 100%, the output of the laser beam source necessary at the time of record becomes on the order of 30[mW], and that necessary at the time of reproduction becomes 3[mW]. This state substantially correspond to the dotted lines B, A shown in FIG. 7B, respectively. In addition, the spontaneous emission component emitted from the light source 1 corresponds to the dotted line C in FIG. 7B, and since TE polarized light and TM polarized light are contained therein in substantially the same quantity, the intensity of both TE polarized light and TM polarized light in the spontaneous emission component outputted at the time of record becomes on the order of 0.90[mW], and the intensity of both TE polarized light and TM polarized light in the spontaneous emission component outputted at the time of reproduction become on the order of 0.77[mW].

On the other hand, as to the front monitoring photodetector 13, in consideration of FFP out of the effective range, the vignetting factor of the light receiving portion of the photodetector 13 is made to be 0.5% for laser beam and 1.0% for spontaneous emission component. When setting like this, a luminous intensity detected at the photodetector 13 at the time of record is;

(laser beam(TE polarized light)) +

(spontaneous emission component (TE polarized light)) +

(spontaneous emission component (TM polarized light)) =

$(30.0 \times 0.5\%) + (0.90 \times 1.0\%) + (0.90 \times 1.0\%) = 0.17$ [mW]

In addition, similarly, a luminous intensity detected at the photodetector 13 at the time of reproduction is;

$$= (3 \times 0.5\%) + (0.77 \times 1.0\%) + (0.77 \times 1.0\%)$$
$$= 0.03 \ [\text{mW}]$$

Due to this, the ratio of the quantity of light that reaches the optical information recording medium 8 to be actually used for record and reproduction of information to the quantity of light detected by the photodetector 13 becomes;

0.17/4.5=3.7% at the time of record, and 0.03/0.45=6.7% at the time of reproduction, whereby the ratios become different largely between the time of record and the time of reproduction.

Thus, in the case of the semiconductor laser of GaN in which the spontaneous emission constant is large, since the ratio between the quantity of light for record and reproduction and the quantity of light for APC changes depending on the magnitude of the quantity of emitted light (driving current), there is generated an error in APC.

In the event that there is generated an error in APC and the laser beam output (power) scatters, a problem tends to be caused, in particular, in a writable optical information recording medium such as a phase changeable disk. In the case of the phase changeable disk, since the storing power is changed over at high speeds and the deleting power is set, with a poor accuracy with which a laser beam is outputted, the generation of recording error is easy to occur.

In the reproduction of a writable optical information recording medium, in the event that the reproducing power deviates toward a higher side, there may be caused a risk of occurrence of erroneous deletion. In addition, when reproducing a ROM medium having high reflectance, in the event that the reproducing power scatters largely, the magnitude of an electric signal, which is subjected to photoelectric conversion and amplified in a photodetector for reproduction signal and servo signal for an optical information recording mediun, scatters largely, and due to the signal waveform being distorted or being too small, the generation of a read error is facilitated.

Furthermore, since the effect of the aforesaid stray light is increased not only due to the problem with the APC error but also due to the spontaneous emission component of the semiconductor laser of GaN system being large, stray light reaches the photodetector for reproduction signal and servo signal for the optical information recording medium, whereby the deterioration in quality of various signals such as an increase in noise or deterioration in jitter tends to be called for easily.

SUMMARY OF THE INVENTION

The invention was made with a view to solving the problems, and an object thereof is to provide an optical head, and an optical reproduction apparatus and an optical record and reproduction apparatus which have the optical head installed therein, which optical head can eliminate an error in record and reproduction of information by providing a beam attenuation means such as a polarizer for attenuating an unnecessary polarization component at a position along the length of an optical path for the optical head, so that light polarized in a single direction is made to be incident on a front monitoring photodetector, whereby an accuracy with which the intensity of a laser beam is detected is increased.

In addition, another object of the invention is to provide an optical head, and an optical reproduction apparatus and an optical record and reproduction apparatus which have the optical head installed therein, which optical head can reduce stray light by attenuating an unnecessary polarized component by an attenuation means.

With a view to attaining the objects, according to a first aspect of the invention, there is provided an optical head including a light source, an objective lens for converging beams of light that are emitted from the light source on an information recording surface of an optical information recording medium, a photodetector for detecting part of the beams of light that are emitted from the light source, and a beam attenuation means for attenuating a predetermined polarization component contained in the beams of light that are emitted from the light source.

The predetermined polarization component of the beams of light emitted from the light source is attenuated by the beam attenuation means, resulting in beams of light having a certain polarization component.

According to a second aspect of the invention, there is provided an optical head as set forth in the first aspect of the invention, wherein the beam attenuation means is provided on an optical path at a position between the light source and the photodetector.

The predetermined polarization component of at least part of the beams of light emitted from the light source is attenuated by the beam of attenuation means, resulting in beams of light which are incident on the photodetector without being converged on the optical information recording medium.

According to a third aspect of the invention, there is provided an optical head as set forth in the second aspect of the invention, where the a beam splitter is provided on the optical path at a position between the beam attenuation means and the objective lens, and wherein the photodetector is provided so as to receive, among the beams of light that are emitted from the light source and are then split by the beam splitter, beams of light that are not incident on the objective lens.

The beams of light emitted from the light source are split into reflected light and transmitted light by the beam splitter. One part of the beams of light so split is incident on the objective lens and is then converged on the information recording surface of the optical information recording medium. The predetermined polarization component of the other portion of the beams of light so split, which is not incident on the objective lens, is attenuated by the beam attenuation means at a certain point from emitted from the light source until received by the photodetector so as to have the certain polarization component. Consequently, it follows that the photodetector receives the beams of light which have the certain polarization component.

According to a fourth aspect of the invention, there is provided an optical head as set forth in the third aspect of the invention, wherein the beam splitter differs in at least transmittance or reflectance depending upon a polarization component contained in a beam of light which is incident on the beam splitter.

According to a fifth aspect of the invention, there is provided an optical head as set forth in the third or fourth aspect of the invention, wherein a collimator lens is provided on the optical path at a position between the light source and the beam splitter.

According to a sixth aspect of the invention, there is provided an optical head as set forth in the first or second aspect of the invention, wherein the photodetector is provided so as to receive part of beams of light emitted from the light source to be out of the optical path between the light source and the objective lens.

Of the beams of light emitted from the light source, the beams of light emitted out of the optical path between the light source and the objective lens are partially received by the photodetector without being converged on the optical information recording medium. By providing the beam attenuation means between the light source and the photodetector, the predetermined polarization component of the beams of light so received by the photodetector is attenuated, so that the resulting beams of light have the certain polarization component.

According to a seventh aspect of the invention, there is provided an optical head as set forth in any of the first to sixth aspects of the invention, wherein the beam attenuation means is provided so as to be adjacent to the light source.

The predetermined polarization component of the beams of light emitted from the light source is attenuated by the beam attenuation means provided adjacent to the light source, resulting in beams of light having the certain polarization component.

According to an eighth aspect of the invention, there is provided an optical head as set forth in any of the third to fifth aspects of the invention, wherein the beam attenuation means is provided between the beam splitter and the photodetector.

The beams of light emitted from the light source are split into reflected light and transmitted light by the beam splitter. One part of the beams of light so split is incident on the objective lens and is then converged on the information recording surface of the optical information recording medium. The predetermined polarization component of the other portion of the beams of light so split, which is not incident on the objective lens, is attenuated by the beam attenuation means, resulting in beams of light having the certain polarization component, which beams of light are received by the photodetector.

According to a ninth aspect of the invention, there is provided an optical head as set forth in the sixth aspect of the invention, wherein the beam attenuation means attenuates only beams of light that are emitted from the light source towards the photodetector.

Of the beams of light emitted from the light source, the beams of light which are incident on the objective lens are converged on the information recording surface of the optical information recording medium. On the other hand, the predetermined polarization component of the beams of light emitted so as to be out of the optical path between the light source and the objective lens is attenuated by the beam attenuation means, resulting in beams of light having the certain polarization component. Then, the beams of light having the certain polarization component are received by the photodetector.

According to a tenth aspect of the invention, there is provided an optical head as set forth in the eighth or ninth aspect of the invention, wherein the beam attenuation means is a polarizer film, which is attached to the photodetector.

According to an eleventh aspect of the invention, there is provided an optical head as set forth in any of the first to tenth aspects of the invention, wherein the light source is a semiconductor laser of nitride system.

According to a twelfth aspect of the invention, there is provided an optical reproduction apparatus having an optical head as set forth in any of the first to eleventh aspects of the invention and a control means for controlling an output from the light source based on a signal from the photodetector of the optical head.

According to a thirteenth aspect of the invention, there is provided an optical record and reproduction apparatus having an optical head as set forth in any of the first to eleventh aspects of the invention and a control means for controlling an output from the light source based on a signal from the photodetector of the optical head.

[Advantages of the Invention]

As discussed above, according to the optical head set forth in the first to eighth aspects of the invention, by providing the beam attenuation means for attenuating the beams of light having the predetermined polarization component, it becomes possible to allow the beams of light which are polarized in the single direction to be incident on the front monitoring photodetector, whereby the accuracy with which the intensity of a laser beam is detected can be increased, thereby making it possible to avoid errors in record and reproduction of information.

In addition, since the polarization component, which is not used in information record and reproduction and is reflected on interior walls of the housing accommodating the optical head and optical devices which constitute the optical head to thereby constitute stray light, can be attenuated, it becomes possible to reduce stray light. As a result, it becomes possible to prevent the deterioration in quality of various signals such as an increase in noise and deterioration in jitter.

Furthermore, according to the optical head set forth in the ninth aspect of the invention, in addition to the advantages just described above, by attenuating the predetermined polarization component of only the beams of light which are not used in information record and reproduction, there is generated no aberration in the beams of light which are not used in information record and reproduction. As a result, the effect of aberration on the record and reproduction of information is eliminated, thereby making it possible to implement stable record and reproduction of information. In addition, according to the optical head set forth in Claim 10, in addition to the advantage described just above, a simple and easy handling is made possible by using the polarizer film, thereby making it possible to attempt to make the optical head thinner in thickness and lower in price.

In addition, according the optical reproduction apparatus described in the twelfth aspect of the invention and the optical record and reproduction apparatus described in the thirteenth aspect of the invention, since the accuracy of detecting the intensity of a laser beam can be increased, it becomes possible to avoid the occurrence of errors in record and reproduction of information, thereby making it possible to implement a stable information recording. Additionally, it also becomes possible to detect a stable reproduction signal.

DETAILED DESCRIPTION OF THE PREFERRED EMBODIMENTS

Referring to FIGS. 1 to 7, optical heads according to embodiments of the invention will be described below.

First Embodiment

Figure 1:
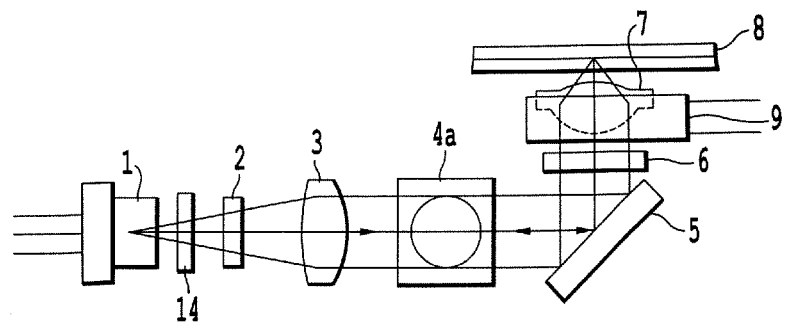
FIG. 1 is a side view of an optical head according to a first embodiment of the invention of the subject patent application.

The construction and function of an optical head according to a first embodiment of the invention will be described by reference to FIGS. 1 and 2. FIG. 1 is a side view of an optical head according to the first embodiment, and FIG. 2 is a plan view of the optical head according to the first embodiment.

Figure 2:
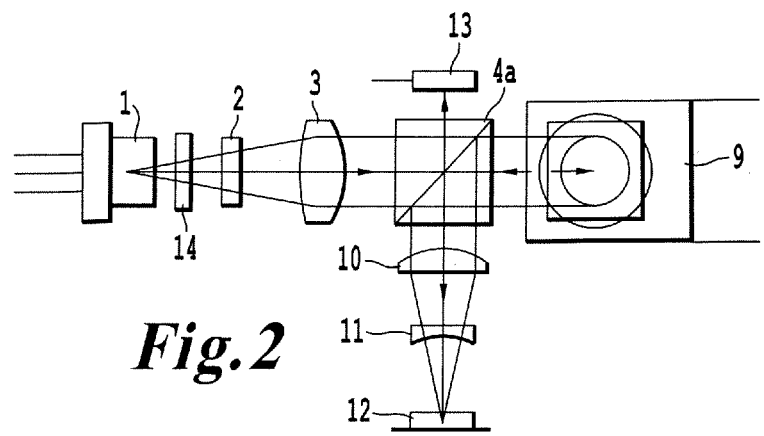
FIG. 2 is a plan view of the optical head according to the first embodiment of the invention of the subject patent application.

As shown in FIGS. 1 and 2, in an optical head according to the embodiment, a polarizer 14 is disposed between a light source 1 and a diffracting device 2. The light source 1 is made up of, for example, a semiconductor laser of nitride system represented by GaN (a violet semiconductor laser). In addition, the light source 1 is disposed such that the direction of TE polarized light emitted from the light source 1 coincides with the direction of P polarized light in a beam splitter 4a. Beams of light emitted from the light source 1 are incident on the polarizer 14. In the event that the direction of transmission axis of the polarizer 14 is adjusted such that on the light emitted from the light source 1, TE polarized light is transmitted therethrough, TM polarized light, which is an unnecessary spontaneous emission component, can be attenuated. The polarizer 14 acts as a beam attenuation means.

Beams of light, which have transmitted through the polarizer 14, further transmit through the diffracting device 2 and are split into three beams of light for generating a tracking error in the diffracting device 2. The beams of light that have transmitted through the diffracting device 2 are made to be parallel light by a collimator lens 3. Since only S polarized light is attenuated by the polarizer 14, beams of light that are incident on the beam splitter 4a are constituted substantially only by P polarized light. This beam splitter 4a has properties to transmit on the order of 90% of P polarized light and to reflect on the order of 10% thereof.

As shown in FIG. 1, the beams of light that have transmitted through the beam splitter 4a are reflected on a reflecting mirror 5 for rise, whereby the optical path thereof is bent. Then, the beams of light so bent are made into beams of circular polarized light when transmitting through a ¼ wavelength plate 6 for incidence on an objective lens 7. The beams of light are converged in the objective lens 7 so as to be converged on an information recording surface of an optical information recording medium 8. Note that the objective lens 7 is installed on an actuator 9 which is movable in focusing and tracking directions.

Beams of light that are reflected on the information recording surface of the optical information recording medium 8 transmit through the objective lens 7 and are converted into beams of linear polarized light traveling in a direction which intersects at right angles with the polarizing direction in an outbound path from the light source 1 to the ¼ wavelength plate 6 in the ¼ wavelength plate 6. Then, the beams of light that are so converted are reflected by the reflecting mirror 5 so as to be incident on the beam splitter as beams of S polarized light.

Since this beam splitter 4a has properties to reflect nearly 100% of S polarized light, the beams of light that are reflected on the beam splitter 4a are made into converged light in an imaging lens 10, as shown in FIG. 2, and is given an astigmatic aberration for generating a focus error signal in an anamorphic lens 11. Then, the beams of light are incident on a photodetector 12, which converts the beams of light so incident thereon into an electric signal in accordance with a quantity of light so received. A predetermined operation is applied to the electric signal resulting from the conversion so as to generate focus error signal, tracking error signal and reproduction signal.

On the other hand, of the beams of light emitted from the light source 1, part thereof, which is reflected on the beam splitter 4a, is, as shown in FIG. 2, incident on a front monitoring photodetector 13. The beams of light so incident on the photodetector 13 are converted into an electric signal for monitoring outputs from the light source 1 by a light receiving portion of the photodetector 13, and the output monitoring electric signal resulting from the conversion is used for feedback control of outputs from the light source 1. Then, by implementing a power control through APC in order to have constant outputs from the light source 1, thereby attempting to stabilize the power level of beams of light.

Thus, according to the optical head constructed as has been described above, since, of the beams of light emitted from the light source 1, TM polarized light can be attenuated by the polarizer 14, it becomes possible to allow light polarized in the single direction to be incident on the front monitoring photodetector 13 without being affected by the polarizing properties of the beam splitter 4a. By providing the beam attenuation means such as the polarizer for attenuating the unnecessary polarization component, allowing the light polarized in the single direction to be incident on the front monitoring photodetector and increasing the accuracy of detecting the intensity of laser beams, the ratio between the quantity of light for information record and reproduction and the quantity of light for APC when the quantity of emitted laser beam changes is allowed to fluctuate little, thereby making it possible to increase the accuracy with which the output of the laser beams is controlled.

Note that as with the optical head according to the embodiment of the invention, when the polarizer 14 is disposed within the optical path of the beams of light which fall within the effective range, a fact needs to be taken into consideration that an aberration is generated through the transmission of beams of light through the polarizer 14 and the aberration so generated affects the record and reproduction of information. In this case, by utilizing a polarizer plate or the like in which both sides of a highly accurate polarizer prism or a polarizer film are sandwiched by sheets of glass, and an attenuation layer having the same index of refraction as that of the polarizer film is provided in a gap formed between the prism or film and the sheet of glass so applied thereto, the effect of the aberration can be suppressed.

Next, the error of APC will be described specifically. As has been described above, the beam splitter 4a transmits on the order of 90% of P polarized light, reflects on the order of 10% thereof, reflects nearly 100% of S polarized light and transmits 0% thereof In a case where intensities with which beams of light, which are converged on to the information recording surface of the optical recording medium 8 to form beam spots directly used for recording and reproducing of information, are emitted onto the optical information recording medium 8 are 4.5[mW] and 0.45[mW], respectively, assuming that the light utilization efficiency of the optical system for the optical head excluding the beam splitter 4b is 15%, since the transmittance of the beam splitter 4b for the P polarized light (=TE polarized light) is 90%, the output of the laser beam source necessary at the time of record becomes on the order of 33[mW], and that necessary at the time of reproduction becomes 3.3[mW]. This state substantially correspond to the dotted lines B, A shown in FIG. 7B, respectively. In addition, the spontaneous emission component emitted from the light source 1 corresponds to the dotted line C in FIG. 7B, and since TE polarized light and TM polarized light are contained therein in substantially the same quantity, the intensity of both TE polarized light and TM polarized light in the spontaneous emission component outputted at the time of record becomes on the order of 0.92[mW], and the intensity of both TE polarized light and TM polarized light in the spontaneous emission component outputted at the time of reproduction become on the order of 0.77[mW].

Figure 11:
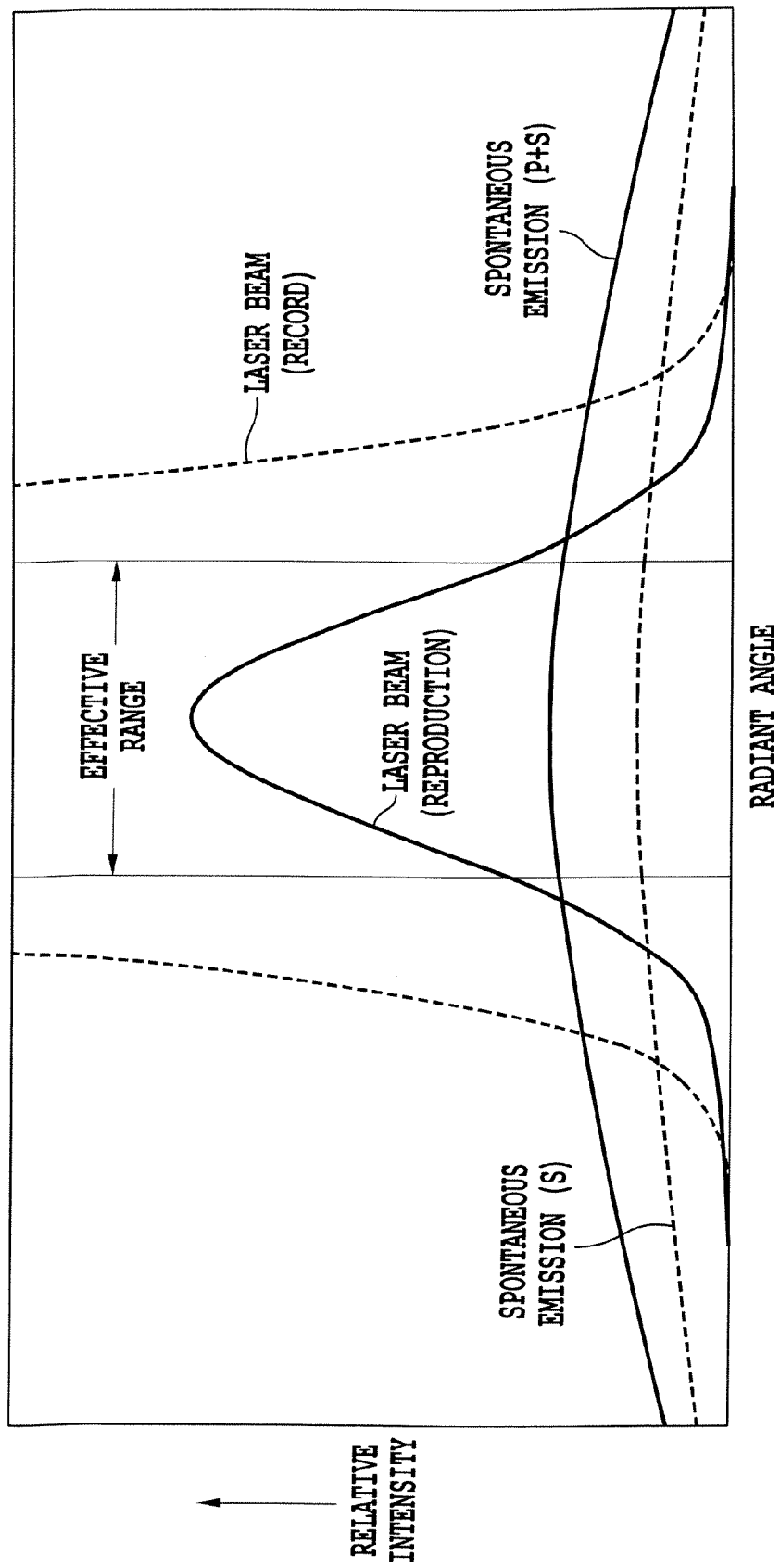
FIG. 11 is agraph exemplarily illustrating light quantity distribution (FFP) of light emitted from a light source.

On the other hand, as to the front monitoring photodetector 13, in consideration of an FFP that is shown exemplarily in FIG. 11, the vignetting factor of the light receiving portion of the photodetector 13 is made to be 4.0% for laser beam and 3.0% for spontaneous emission component. FIG. 11 is a graph illustrating exemplarily the light quantity distribution (FFP) of light emitted from the light source 1, in which the relative intensity is represented by the axis of ordinates, whereas the radiant angle of light emitted from the light source 1 is represented by the axis of abscissas. In the drawing, laser beam at the time of record, laser beam at the time of reproduction, spontaneous emission component (P polarized light+S polarized light) and spontaneous emission component (S polarized light) are shown. Since S polarized light in the light incident on the beam splitter 4a is attenuated by the polarizer 14, as to the reflectance, 10% only for P polarized light (=TE polarized light) may be taken into consideration, a luminous intensity detected at the photodetector 13 at the time of record is;

(laser beam(TE polarized light)) +

(spontaneous emission component(TE polarized light)) =

$$(33 \times 4.0\% \times 10\%) + (0.92 \times 3.0\% \times 10\%) = 0.14 \text{ [mW]}$$

In addition, similarly, a luminous intensity detected at the photodetector 13 at the time of reproduction is;

$$= (3.3 \times 4.0\% \times 10\%) + (0.77 \times 3.0\% \times 10\%)$$

$$= 0.02 \text{ [mW]}$$

Due to this, the ratio of the quantity of light that reaches the optical information recording medium 8 to be actually used for record and reproduction of information to the quantity of light detected by the photodetector 13 becomes;

0.14/4.5=3.0% at the time of record, and 0.02/0.45=3.5% at the time of reproduction, whereby the ratios are improved so as to become substantially the same between the time of record and the time of reproduction.

Thus, in the optical head according to the embodiment of the invention, even in the event that the magnitude of quantity of laser beam emitted from the semiconductor laser (driving current) changes, the ratio between the quantity of light for record and reproduction and the quantity of light for APC is maintained substantially constant. Consequently, it becomes possible to control the intensity of laser beams with good accuracy.

Note that there exists a risk that the spontaneous emission component, which is not used in information record and reproduction and in which FFP expands largely, is reflected irregularly on the interior walls of the optical head housing and the optical devices which make up the optical head to thereby constitute stray light. According to the optical head of the embodiment of the invention, since TM polarized light contained in the light component is attenuated at the position near the light source 1, and hence, the beams of light that have transmitted through the polarizer 14 are made up only of TE polarized light, it becomes possible to reduce stray light. In addition, in particular, since as the optical head becomes smaller in size, stray light is allowed to reach the photodetector for reproduction signal and servo signal in the optical information recording medium more easily, the effect of reducing stray light by disposing the polarizer 14 as in the embodiment of the invention is increased.

Second Embodiment

Figure 3:
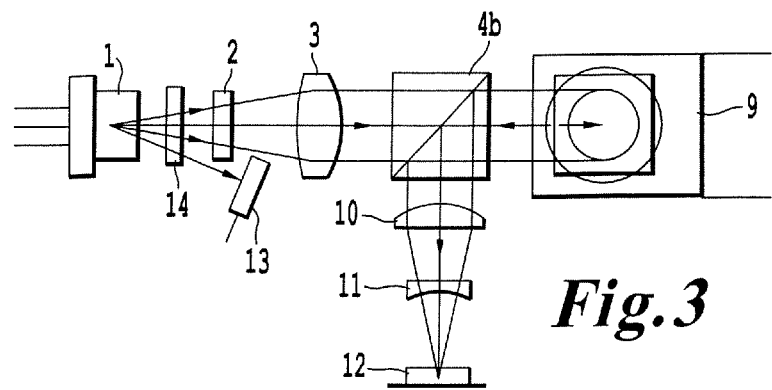
FIG. 3 is a plan view of an optical head according to a second embodiment of the invention of the subject patent application.

The construction and function of an optical head according to a second embodiment of the invention will be described below by reference to FIG. 3. FIG. 3 is a plan view of an optical head according to the second embodiment.

While the optical head according to the second embodiment has substantially the same construction as that of the optical head according to the first embodiment, the former differs from the latter in that APC is implemented by utilizing part of beams of light which fall out of the effective range and hence which are not used in information record and reproduction.

As shown in FIG. 3, beams of light emitted from a light source 1 are incident on a polarizer 14. Similarly to the first embodiment, the TM polarization component, which is the unnecessary spontaneous emission component, is attenuated by the polarizer 14. The beams of light that have transmitted the polarizer 14 transmit through a diffracting device 2, are then split into three beams of light for generating a tracking error signal and are made into parallel light after the transmission through a collimator lens 3. Since only S polarized light is attenuated by the polarizer 14, beams of light which are incident on a beam splitter 4a are made up of P polarized light. This beam splitter 4a has properties to transmit nearly 100% of P polarized light.

Laser beams of the beams of light that have transmitted through the beam splitter 4b extend, similarly to the first embodiment, through a reflecting mirror 5 for rise, a ¼ wavelength plate 6 and an objective lens 7 and are then converged on an information track on an information recording surface of an optical information recording medium 8.

Beams of light which are reflected on the information recording surface of the optical information recording medium 8 are, similarly to the first embodiment, converted into beams of linear polarized light which intersect at right angles with the polarizing direction in an outbound path from the light source 1 to the ¼ wavelength plate 6 in the ¼ wavelength plate 6, and are then reflected by the reflecting mirror 5 to thereby be incident on the beam splitter 4b.

Since the beam splitter 4b has properties to reflect nearly 100% of S polarized light, beams of light that are reflected on the beam splitter 4b travel, similarly to the first embodiment, through an imaging lens 10 and an anamorphic lens 11 before the beams of light are incident on a photodetector 12. The photodetector 12 converts the beams of light into an electric signal in accordance with the quantity of light received. A predetermined operation is applied to the electric signal resulting from the conversion so as to generate focus error signal, tracking error signal and reproduction signal.

On the other hand, of the beams of light that have transmitted through the polarizer 14, part of the beams of light which fall out of the effective range is not incident on the diffracting device 2 but is incident on a front monitoring photodetector 13. Since TM polarized light is attenuated by the polarizer 14, beams of light which are incident on the photodetector 13 are made up only of TE polarized light. The beams of light, which are so incident on the photodetector 13, are converted into an electric signal for monitoring outputs from the light source 1 by a light receiving portion of the photodetector 13, and the output monitoring electric signal resulting from the conversion is used for feedback control of output from the light source 1. Then, a power control is implemented by APC so that outputs from the light source 1 become constant, thereby attempting to stabilize the power level of the beams of light.

In a case where the beams of light which fall out of the effective range are received by the front monitoring photodetector 13, of the expansion of the FFP of the beams of light, the beams of light residing in an area which deviate from the center of the FFP are used. Since the expansion of FFP of a laser beam component is narrow, the intensity of the laser beam components is drastically decreased as they deviate further from the effective range. Due to this, the ratio of the spontaneous emission component is relatively increased, whereby the error of APC is increased.

As with the embodiment of the invention, however, by disposing the polarizer 14 between the light source 1 and the diffracting device 2 so as to attenuate TM polarized light contained in the beams of light emitted from the light source 1, it becomes possible to constitute the beams of light which are incident on the photodetector 13 only by the TE polarization component, whereby the ratio between the quantity of light for record and reproduction and the quantity of light for APC when the quantity of laser beam emitted from the light source 1 is allowed to fluctuate less, thereby making it possible to increase the accuracy of detecting the intensity of laser beams.

Note that, similarly to the optical head according to the first embodiment, since the TM polarization component contained in the laser beam component is attenuated at the position close to the light source 1, it becomes possible to reduce stray light. In addition, similarly to the optical head according to the first embodiment, since the polarizer 14 is disposed within the optical path of the beams of light which fall within the effective range, the effect of aberration needs to be taken into consideration. Similarly to the first embodiment, a polarizer plate or the like may be used in which both sides of a polarizer prism or polarizer film having high accuracy is sandwiched by sheets of glass, and an attenuation layer having the same index of refraction as that of the polarizer film is provided in a gap formed between the prism or film and the sheet of glass so applied thereto.

Next, the error of APC will be described specifically. In a case where intensities with which beams of light, which are converged on to the information recording surface of the optical recording medium 8 to form beam spots directly used for recording and reproducing of information, are emitted onto the optical information recording medium 8 are 4.5 [mW] and 0.45[mW], respectively, assuming that the light utilization efficiency of the optical system for the optical head excluding the beam splitter 4b is 15%, since the transmittance of the beam splitter 4b for the P polarized light (=TE polarized light) is 100%, the output of the laser beam source necessary at the time of record becomes on the order of 30[mW], and that necessary at the time of reproduction becomes 3[mW]. This state substantially correspond to the dotted lines B, A shown in FIG. 7B, respectively. In addition, the spontaneous emission component emitted from the light source 1 corresponds to the dotted line C in FIG. 7B, and since TE polarized light and TM polarized light are contained therein in substantially the same quantity, the intensity of both TE polarized light and TM polarized light in the spontaneous emission component outputted at the time of record becomes on the order of 0.90[mW], and the intensity of both TE polarized light and TM polarized light in the spontaneous emission component outputted at the time of reproduction become on the order of 0.77[mW].

On the other hand, as to the front monitoring photodetector 13, as shown exemplarily in FIG. 11, in consideration of FFP out of the effective range, the vignetting factor of the light receiving portion of the photodetector 13 is made to be 0.5% for laser beam and 1.0% for spontaneous emission component. Since TM polarized light in the light incident on the photodetector 13 is attenuated by the polarizer 14, only TM polarized light may be taken into consideration, and a luminous intensity detected at the photodetector 13 at the time of record is;

(laser beam (TE polarized light)) +

(spontaneous emission component (TE polarized light)) =

$(30 \times 0.5\%) + (0.90 \times 1.0\%) = 0.16$ [mW]

In addition, similarly, a luminous intensity detected at the photodetector 13 at the time of reproduction is;

$= (3 \times 0.5\%) + (0.77 \times 1.0\%)$ $= 0.02$ [mW]

Due to this, the ratio of the quantity of light that reaches the optical information recording medium 8 to be actually used for record and reproduction of information to the quantity of light detected by the photodetector 13 becomes;

0.16/4.5=3.5% at the time of record, and 0.02/0.45=5.0% at the time of reproduction, whereby the quantity of fluctuation of the detection ratio is improved. Consequently, the intensity of laser beam can be controlled with good accuracy.

Third Embodiment

Figure 4:
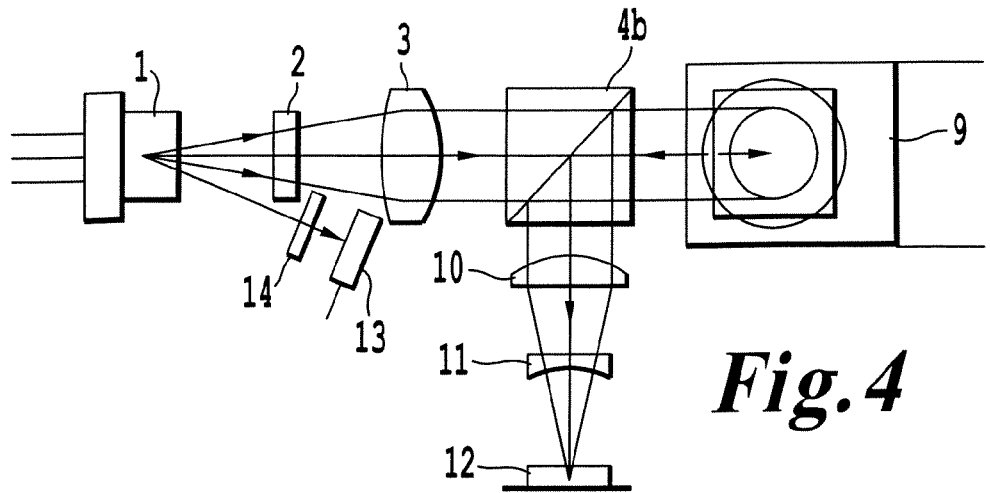
FIG. 4 is a plan view of an optical head according to a third embodiment of the invention of the subject patent application.

The construction and function of an optical head according to a third embodiment will be described below by reference to FIG. 4. FIG. 4 is a plan view of the optical head according to the third embodiment.

While the optical head according to the third embodiment of the invention has substantially the same construction as that of the optical head according to the second embodiment, the former differs from the latter in position where a polarizer 14 is disposed. A photodetector 13 is disposed on an optical path of beams of light which are out of the effective range, and the polarizer 14 is disposed on the optical path of the beams of light which are out of the effective range and directly in front of the photodetector 13.

As shown in FIG. 4, beams of light, which are emitted from a light source 1 and are situated in the vicinity of the center of FFP within the expansion of FFP, are incident on a diffracting device 2 so as to be split into three beams of light for generating a tracking error signal. Then, similarly to the optical head according to the second embodiment, the beams of light that have transmitted through a collimator lens 3 are made into parallel beams of light so as to be incident on a beam splitter 4b.

Since the beam splitter 4b transmits nearly 100% of P polarized light and reflects nearly 100% of S polarized light, TE polarization component, which is P polarized light, transmits through the beam splitter 4b, whereas TM polarized light, which is the unnecessary spontaneous emission component, is reflected on the beam splitter 4b as S polarization component.

Laser beams of the beams of light that have transmitted through the beam splitter 4b are, similarly to the second embodiment, converged on an information track on an information recording surface of an optical information recording medium 8. The beams of light that are reflected on the information recording surface of the optical information recording medium 8 are converted into beams of linear polarized light traveling in a direction which intersects at right angles with the polarizing direction in an outbound path from the light source 1 to a ¼ wavelength plate 6 at the ¼ wavelength plate 6 so as to be incident on the beam splitter 4b as beams of S polarized light.

Since the beam splitter 4b has properties to reflect nearly 100% of S polarized light, the beams of light which are reflected on the beam splitter 4b travel, similarly to the second embodiment, along an imaging lens 10 and an anamorphic lens 11 so as to be incident on a photodetector 12. The photodetector 12 converts the beams of light into an electric signal in accordance with a quantity of light that it has received. A predetermined operation is applied to the electric signal resulting from the conversion so as to generate focus error signal, tracking error signal and reproduction signal.

On the other hand, the beams of light, which are emitted from the light source 1 and are situated at other locations than in the vicinity of the center of FFP within the expansion of FFP, that is, situated out of the effective range, are not incident on the diffracting device 2 but are incident on the polarizer 14 which is disposed on the optical path for the beams of light which fall out of the effective range. Then, S polarized light is attenuated by the polarizer 14 and the resulting beams of light are incident on a photodetector 13. The beams of light so incident on the photodetector 13 are then converted into an electric signal for monitoring outputs from the light source 1 by a light receiving portion of the photodetector 13, and the output monitoring electric signal is used for feedback control of outputs from the light source 1. Then, a power control is implemented through APC in order to have constant outputs from the light source, thereby attempting to stabilize the power level of the beams of light.

According to the optical head constructed as has been described above, similarly to the optical heads according to the first and second embodiments, the ratio between the quantity of light for record and reproduction and the quantity of light for APC fluctuates less, thereby making it possible to increase the accuracy of detecting the intensity of laser beams.

Note that, in the optical head according to the embodiment, since the polarizer 14 is disposed within the optical path not for the beams of light which fall within the effective range but for the beams of light which fall out of the effective range, the effect of aberration does not need to be taken into consideration. Namely, while an aberration is generated when beams of light are allowed to transmit through the polarizer 14, since the beams of light are directed to the optical information recording medium 8 in no case, there is no effect imposed on the record and reproduction of information. Consequently, in the embodiment of the invention, thin and inexpensive polarizer films can be utilized as the polarizer 14. The polarizer films are such as iodine or dichromatic dye is adsorbed to a film base of poly(vinyl alcohol), which is then drawn so that orientations of molecules are aligned in a predetermine direction to thereby provide anisotropy. The polarizer films can be handled in a simple and easy fashion such as by being affixed to the photodetector 13.

Since the calculation of a quantity of error of APC results in the same as the optical head according to the second embodiment, the description thereof will be omitted. In the optical head according to the embodiment, since the polarizer 14 is not adjacent to the light source 1, stray light cannot be reduced by the polarizer 14. However, in an optical head which can originally delete stray light to some extent through the design of a housing for the optical head or optical design, since the polarizer 14 can be constructed as simple as has been described above, parts costs can be reduced and simple and easy production methods can be utilized.

Fourth Embodiment

Figure 5:
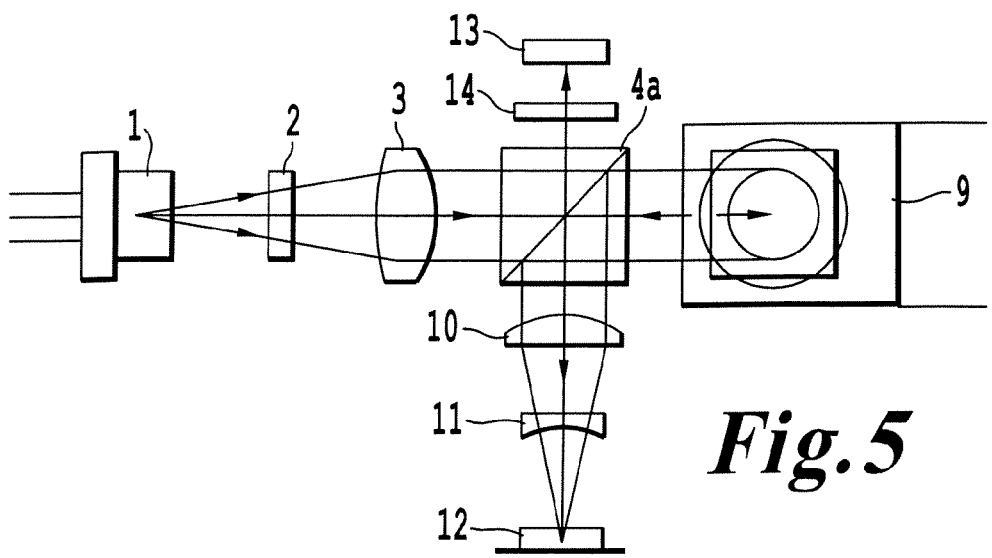
FIG. 5 is a plan view of an optical head according to a fourth embodiment of the invention of the subject patent application.

The construction and function of an optical head according to a fourth embodiment will be described below by reference to FIG. 5. FIG. 5 is a plan view of the optical head according to the fourth embodiment.

While the optical head according to the fourth embodiment has substantially the same construction as that of the optical head according to the first embodiment, the former differs the latter in position where a polarizer 14 is disposed. The polarizer 14 is disposed between a beam splitter 4a and a front monitoring photodetector 13.

As shown in FIG. 5, beams of light emitted from a light source 1 transmit through a diffracting device 2 to thereby split into three beams of light for generating a tracking error. The beams of light, which have transmitted through the diffracting device 2, are made into parallel beams of light by a collimator lens 3. The beams of light, which have been made into the parallel beams of light, are incident on the beam splitter 4a. As this occurs, the beams of light contain a laser beam component and a spontaneous emission component. The beam splitter 4a has properties to transmit on the order of 90% of P polarized light, reflect on the order of 10% thereof and reflect nearly 100% of S polarized light. Consequently, since nearly 100% of S polarized light is attenuated by the beam splitter 4a, the beams of light which have transmitted through the beam splitter 4a are made up only of P polarized light.

The beams of light that have transmitted through the beam splitter 4a travel, similarly to the first embodiment, along a reflecting mirror 5 for rise, a ¼ wavelength plate 6 and an objective lens 7 to thereby be converged on an information track on an information recording surface of an optical information recording medium 8.

The beams of light that have been reflected on the information recording surface of the optical information recording medium are, similarly to the first embodiment, converted into beams of S polarized light (beams of linear polarized light traveling in a direction which intersects at right angles with an outbound path from the light source 1 to the ¼ wavelength plate 6) in the ¼ wavelength plate 6 and are incident on the beam splitter 4a as the beams of S polarized light.

Since the beam splitter 4a has the properties to reflect nearly 100% of S polarized light, the beams of light which are reflected on the beam splitter 4a travel, similar to the first embodiment, along an imaging lens 10 and an anamorphic lens 11 so as to be incident on a photodetector 12. The photodetector 12 converts the beams of light so incident thereon into an electric signal in accordance with a quantity of light that it has received. A predetermined operation is applied to the electric signal resulting from the conversion so as to generate focus error signal, tracking error signal and reproduction signal.

On the other hand, the beams of light that are reflected on the beam splitter 4a contain TE polarized light and TM polarized light. The beams of light so reflected transmit through the polarizer 14 before the beams of light are incident on the photodetector 13. Since unnecessary TM polarized light, which is the spontaneous emission component, is attenuated by the polarizer 14, the beams of light that are incident on the photodetector 13 are made up only of TE polarized light. The beams of light so incident on the photodetector 13 are converted into an electric signal for monitoring outputs from the light source 1 by a light receiving portion of the photodetector 13, and the electric signal resulting from the conversion is then utilized for feedback control of outputs from the light source 1. Then, a power control is implemented through APC so that outputs from the light source 1 become constant, thereby attempting to stabilize the power level of the beams of light.

According to the optical head constructed as has been described above, similarly to the optical heads according to the first to third embodiments, the ratio between the quantity of light for record and reproduction and the quantity of light for APC fluctuates less, and it becomes possible to increase the accuracy of detecting the intensity of laser beams.

Since the calculation of a quantity of error of APC results in the same as the optical head according to the first embodiment, the description thereof will be omitted. In addition, similarly to the optical head according to the third embodiment, also in the optical head according to the embodiment, since the polarizer 14 is not adjacent to the light source 1, stray light cannot be reduced by the polarizer 14. However, in an optical head which can originally delete stray light to some extent through the design of a housing for the optical head or optical design, since the polarizer 14 can be constructed as simple as has been described above, parts costs can be reduced and simple and easy production methods can be utilized.

Fifth Embodiment

Figure 6:
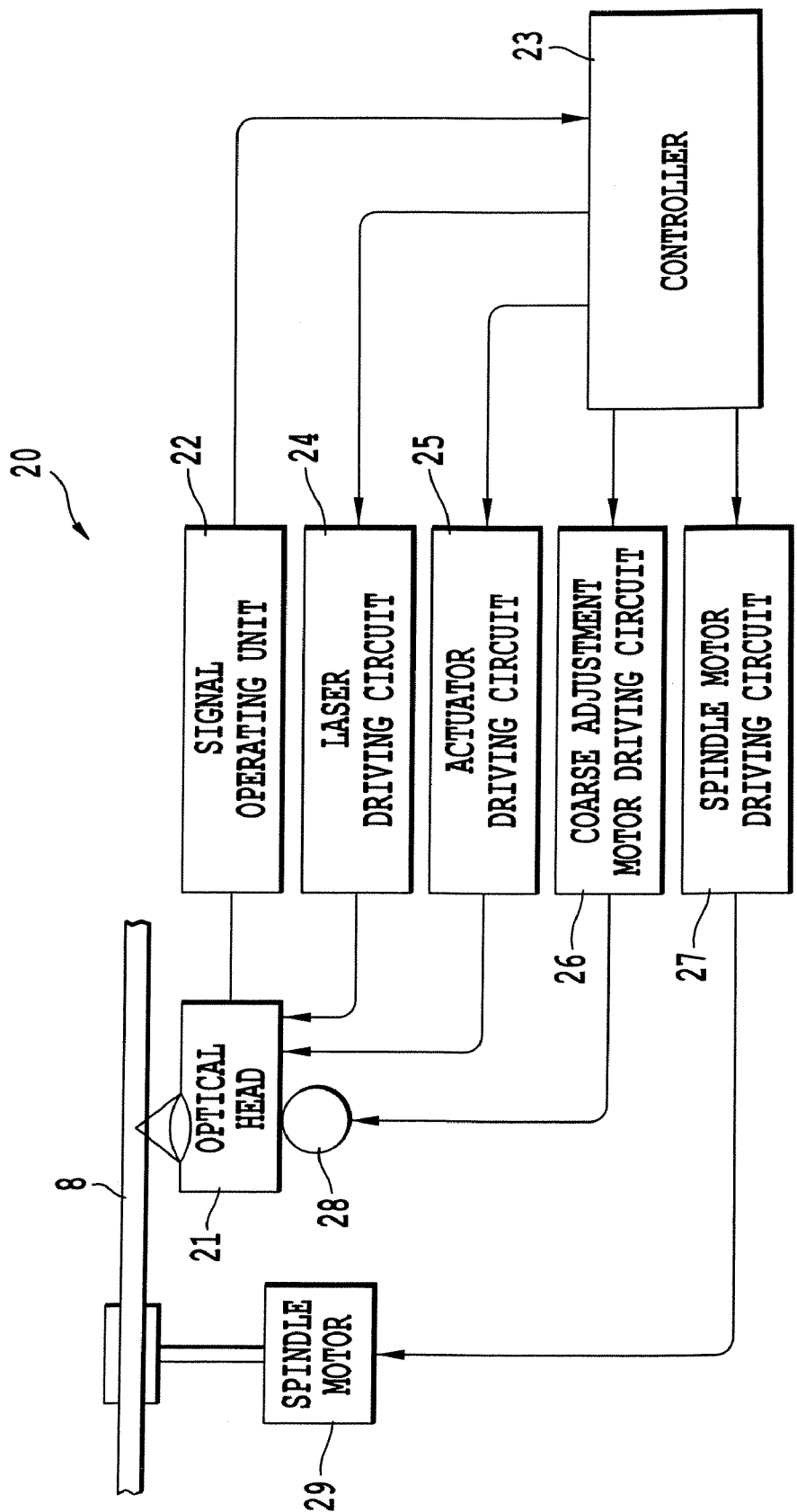
FIG. 6 is a block diagram illustrating the schematic configuration of an optical record and reproduction apparatus according to a fifth embodiment of the invention of the subject patent application.
Figure 7A:
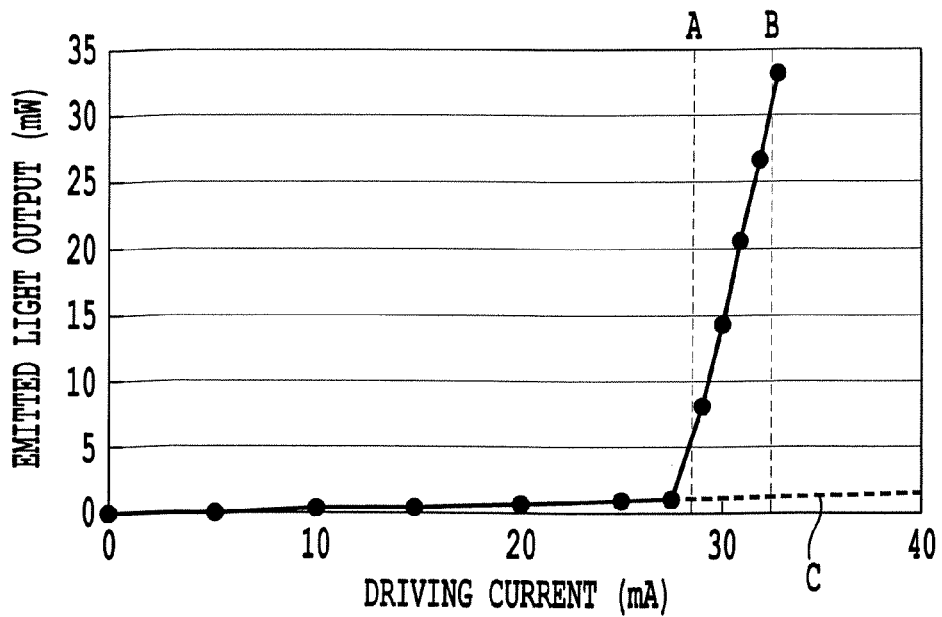
FIG. 7 is a graph showing emitted light output relative to semiconductor laser driving current.
Figure 7B:
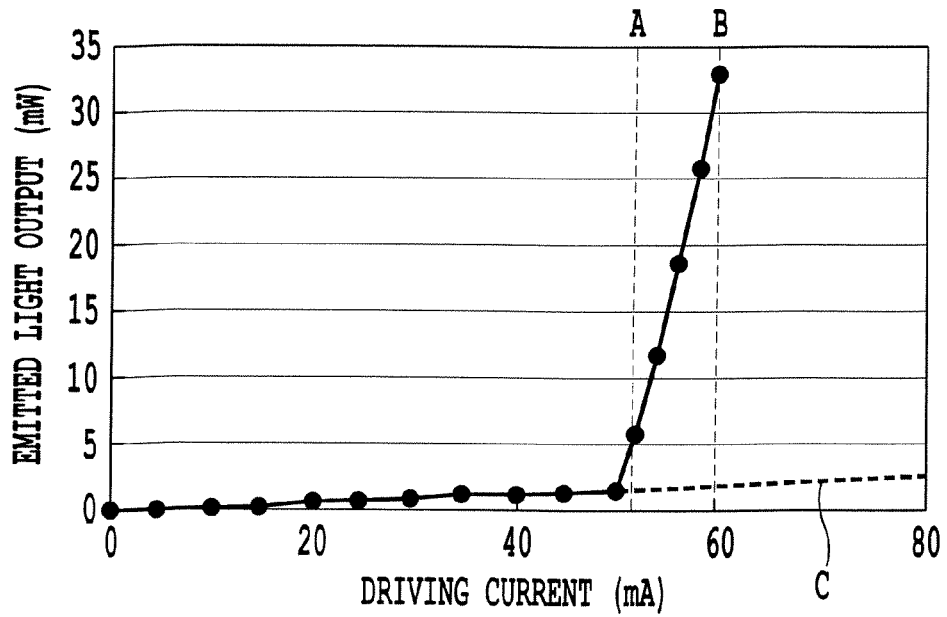
Figure 8:
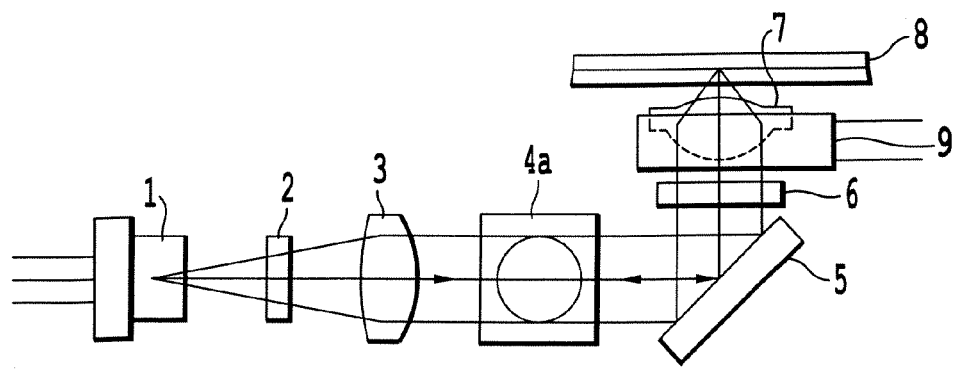
FIG. 8 is a side view of an optical head according to the related art.
Figure 9:
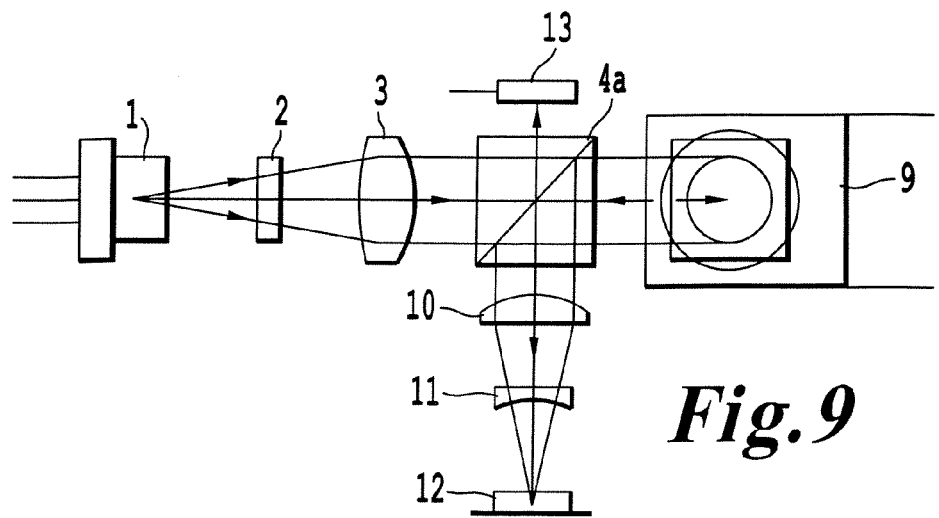
FIG. 9 is a plan view of the optical head according to the related art.
Figure 10:
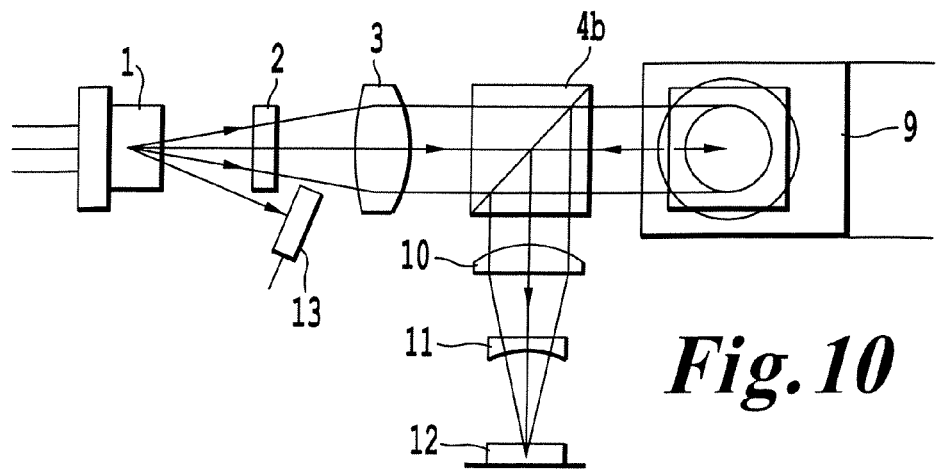
FIG. 10 is a plan view of another optical head according the related art.

Next, as a fifth embodiment of the invention, an optical record and reproduction apparatus including the optical head according to the invention will be described by reference to FIG. 6. FIG. 6 is a block diagram of an optical record and reproduction apparatus according to the fifth embodiment.

An optical record and reproduction apparatus 20 according to the embodiment stores information on an optical information recording medium 8 which is chucked to a spindle motor 29 by a chucking device (not shown) and reproduces the information so stored from the optical information recording medium 8. An optical head 21 is provided on a chassis (not shown) having a slider mechanism and is movable in a radial direction of the optical information recording medium 8 by means of a coarse adjustment motor 28. The optical head of the invention of the subject patent application is used as this optical head 21.

An electric signal outputted from the optical head 21 is inputted into a signal operating unit 22, and the signal operating unit 22 implements operation and amplification of the electric signal so inputted thereinto. Note that this signal operating unit 22 may be installed on the optical head 21. In addition, a controller 23 incorporates therein a focus servo following circuit; a tracking servo following circuit and a laser control circuit, which are designed to control the operation of the optical head 21 and the spindle motor 29. These circuits are not physical ones but may be software executed within the controller. Then, in the controller 23, based on electric signals from the optical head 21, servo signals such as, in addition to data reproduction signal, focus error signal and tracking error signal are calculated. In a digital signal processing circuit, not shown, wave equalization and wave shaping are implemented on the data reproduction signal, and thereafter, the data signal so processed is converted into an analog signal in a D/A converter, not shown, for output. In storing information, data to be stored is converted into a laser driven signal, and a laser driving signal is supplied to the optical head 21 via a laser driving circuit 24 to thereby implement the record of data.

An actuator driving circuit 25 receives a focus error signal and a tracking error signal to implement a focus position control and a tracking position control of the objective lens of the optical head 21. In addition, a spindle motor driving circuit 27 drives the spindle motor 29 to implement a rotational control of the optical information recording medium 8, and a coarse adjustment motor driving circuit 26 drives the coarse adjustment motor 28 to move the optical head 21 in the radial direction of the optical information recording medium 8. In addition, the laser driving circuit 24 supplies a laser driving signal for the optical head 21 to control the output of the light source. Note that this laser driving circuit 24 may be installed on the optical head 21. Furthermore, the output of the photodetector 13 is fed back to the laser driving circuit 24, so that the power control is implemented through APC so as to have constant outputs from the light source 1, thereby attempting to stabilize the power level of beams of light radiated to the optical information recording medium 8.

Furthermore, the optical information record and reproduction apparatus 20 of the embodiment has a CPU for controlling the entirety of the apparatus, a memory and an interface for implementing transmission and reception of signals to and from an external apparatus.

In the optical information record and reproduction apparatus 20, by feeding back the output from the photodetector 13 of the optical head 21 to the laser driving circuit 24 so as to drive the light source 1 to have a predetermined output, the output of the light source can be controlled in a stable fashion. As a result, the record of information can be performed in a stable fashion, and it becomes possible to detect a stable reproduction signal.

Note that while the invention has been described as being applied to the optical record and reproduction apparatus, the invention may be applied to an optical reproduction apparatus which performs exclusively the reproduction of optical signals.

This application is based upon and claims the benefit of priority of Japanese Patent Application No. 2004-41701 filed on Feb. 18, 2004, the contents of which are incorporated herein by reference in its entirety.

What is claimed is:

1. An optical head comprising:
   a light source including a semiconductor laser of GaN;
   an objective lens for converging beams of light that are emitted from the light source on an information recording surface of an optical information recording medium;
   a beam splitter;
   a photodetector for detecting part of the beams of light that are emitted from the light source toward one of said optical information recording medium and said objective lens; and
   beam attenuation means, provided on an optical path at a position between the light source and the beam splitter, for passing light of a first predetermined polarization component and attenuating light of a second predetermined polarization component contained in the beams of light that are emitted from the light source toward one of said optical information recording medium and said objective lens.

2. An optical head as set forth in claim 1, wherein the beam attenuation means is provided on an optical path at a position between the light source and the photodetector.

3. An optical head as set forth in claim 1, where the beam splitter is provided on the optical path at a position between the beam attenuation means and the objective lens, and wherein
   the photodetector is provided so as to receive, among the beams of light that are emitted from the light source and are then split by the beam splitter, beams of light that are not incident on the objective lens.

4. An optical head as set forth in claim 3, wherein the beam splitter differs in at least transmittance or reflectance depending upon a polarization component contained in a beam of light which is incident on the beam splitter.

5. An optical head as set forth in claim 3, wherein a collimator lens is provided on the optical path at a position between the light source and the beam splitter.

6. An optical head as set forth in claim 1, wherein the photodetector is provided so as to receive part of beams of light emitted from the light source to be out of the optical path between the light source and the objective lens.

7. An optical head as set forth in claim 6, wherein the beam attenuation means attenuates only beams of light that are emitted from the light source towards the photodetector.

8. An optical head as set forth in claim 7, wherein the beam attenuation means is a polarizer film, which is attached to the photodetector.

9. An optical head as set forth in claim 1, wherein the beam attenuation means is provided so as to be immediately adjacent to the light source.

10. An optical head as set forth in claim 1, wherein the light source is a semiconductor laser of nitride system.

11. An optical reproduction apparatus comprising:
    an optical head as set forth in claim 1; and
    control means for controlling an output from the light source based on a signal from the photodetector of the optical head.

12. An optical record and reproduction apparatus having:
    an optical head as set forth in claim 1; and
    control means for controlling an output from the light source based on a signal from the photodetector of the optical head.

13. An optical head as set forth in claim 1, wherein said beam attenuation means attenuates a polarization component only, a polarization direction of which is perpendicular to that of a polarization component of the beams of light that are converged on an information recording surface of an optical information recording medium.

14. An optical head comprising:
    a light source;
    an objective lens for converging beams of light that are emitted from the light source on an information recording surface of an optical information recording medium;
    a beam splitter;
    a photodetector for detecting part of the beams of light that are emitted from the light source; and
    beam attenuation means for passing light of a first predetermined polarization component and attenuating light of a second predetermined polarization component contained in the beams of light that are emitted from the light source;
    wherein the beam attenuation means is provided between the beam splitter and the photodetector, and the beam attenuation means is a polarizer film, which is attached to the photodetector.

* * * * *